US010635732B2

(12) United States Patent
Ge et al.

(10) Patent No.: US 10,635,732 B2
(45) **Date of Patent: *Apr. 28, 2020**

(54) SELECTING CONTENT ITEMS FOR PRESENTATION TO A SOCIAL NETWORKING SYSTEM USER IN A NEWSFEED

(71) Applicant: Facebook, Inc., Menlo Park, CA (US)

(72) Inventors: Hong Ge, Cupertino, CA (US); Lars Seren Backstrom, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 810 days.

This patent is subject to a terminal disclaimer.

(21) Appl. No.: 14/031,453

(22) Filed: Sep. 19, 2013

(65) Prior Publication Data

US 2015/0081449 A1 Mar. 19, 2015

(51) Int. Cl.
*G06F 16/9535* (2019.01)
*G06Q 30/02* (2012.01)
*G06F 16/2457* (2019.01)
*G06F 3/0482* (2013.01)

(52) U.S. Cl.
CPC ........ *G06F 16/9535* (2019.01); *G06F 3/0482* (2013.01); *G06F 16/24578* (2019.01); *G06Q 30/0269* (2013.01)

(58) Field of Classification Search
CPC ..... G11B 27/34; G11B 27/034; G11B 27/105; G11B 27/031; G11B 27/28; G06Q 30/02; G06Q 30/0269; G06F 17/30675; G06F 17/30696
USPC .................................. 715/723; 707/723, 709
See application file for complete search history.

(56) References Cited

U.S. PATENT DOCUMENTS 8,311,875 B1 11/2012 Lloyd
8,775,405 B2 † 7/2014 Gross
2005/0198056 A1 9/2005 Dumais et al.
2008/0086484 A1 4/2008 Darnell et al.
2012/0042012 A1 2/2012 Darnell et al.
2012/0060121 A1 * 3/2012 Goldberg .............. G06F 3/0482 715/823
2012/0110071 A1 * 5/2012 Zhou ...................... G06Q 10/10 709/204

(Continued)

OTHER PUBLICATIONS

PCT International Search Report, PCT Application No. PCT/US2014/039024, dated Nov. 14, 2014, three pages.

(Continued)

*Primary Examiner* — Joy M Weber
(74) *Attorney, Agent, or Firm* — Fenwick & West LLP

(57) ABSTRACT

To increase the likelihood of a user viewing content items previously identified for presentation but not viewed by the user, a social networking system accesses a view state associated with the user that identifies content items provided to the user and provided content items viewed by the user. Based on the view state, content items previously provided to the user but not viewed by the user are identified. Additional content items whose state has changed since presentation of the content items to the user are also identified. Content items previously presented to the user but not viewed with at least a threshold relevance to the user are ranked along with the additional content items. Based on the ranking, content items are selected for presentation to the user.

20 Claims, 7 Drawing Sheets

Maintain a view state for social networking system user
502

Receive request for content items
504

Identify previously presented but not viewed content items
506

Identify additional content items
508

Identify previously presented but not viewed content items with at least threshold relevance
510

Rank additional content items and previously presented but not viewed content items with at least threshold relevance
512

Provide content items selected based on ranking
514

(56) References Cited

U.S. PATENT DOCUMENTS

| | | | | |
|---|---|---|---|---|
| 2012/0166532 | A1* | 6/2012 | Juan | G06Q 50/01<br>709/204 |
| 2012/0272160 | A1* | 10/2012 | Spivack | G06Q 10/10<br>715/752 |
| 2013/0031034 | A1* | 1/2013 | Gubin | G06Q 10/06393<br>706/12 |
| 2013/0031489 | A1* | 1/2013 | Gubin | G06Q 50/01<br>715/753 |
| 2013/0073632 | A1* | 3/2013 | Fedorov | G06Q 10/101<br>709/205 |
| 2013/0097186 | A1 | 4/2013 | Van Hoff | |
| 2013/0110978 | A1* | 5/2013 | Gordon | H04N 21/2665<br>709/218 |
| 2013/0298038 | A1* | 11/2013 | Spivack | H04L 65/403<br>715/753 |
| 2013/0332523 | A1* | 12/2013 | Luu | G06Q 30/0251<br>709/204 |
| 2014/0019261 | A1* | 1/2014 | Hegeman | G06Q 30/02<br>705/14.71 |
| 2014/0337361 | A1* | 11/2014 | Gailis | G06F 17/30867<br>707/752 |

OTHER PUBLICATIONS

Canadian Intellectual Property Office, Office Action, Canadian Patent Application No. 2,919,438, dated Oct. 31, 2016, two pages.

Japan Patent Office, Office Action, Japanese Patent Application. No. 2016-544317, dated Mar. 6, 2018, five pages.

* cited by examiner
† cited by third party

Figure 6B:
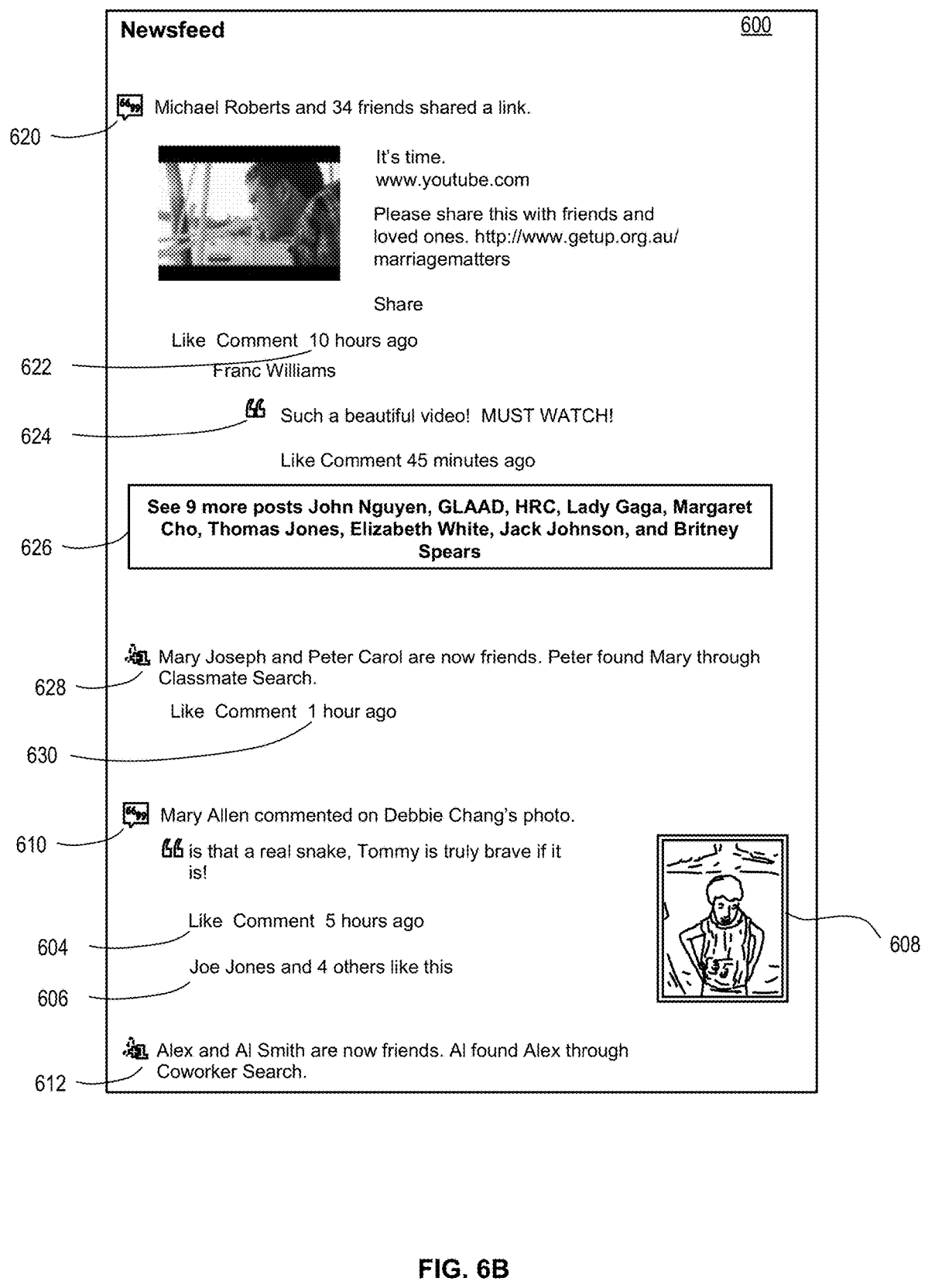

Newsfeed

600

Michael Roberts and 34 friends shared a link.

620

It's time.
www.youtube.com

Please share this with friends and loved ones. http://www.getup.org.au/marriagematters Share Like Comment 10 hours ago

622

Franc Williams

Such a beautiful video! MUST WATCH!

624

Like Comment 45 minutes ago

See 9 more posts John Nguyen, GLAAD, HRC, Lady Gaga, Margaret Cho, Thomas Jones, Elizabeth White, Jack Johnson, and Britney Spears

626

Mary Joseph and Peter Carol are now friends. Peter found Mary through Classmate Search.

628

Like Comment 1 hour ago

630

Mary Allen commented on Debbie Chang's photo.

610 is that a real snake, Tommy is truly brave if it is!

Like Comment 5 hours ago

604

Joe Jones and 4 others like this

606

608

Alex and Al Smith are now friends. Al found Alex through Coworker Search.

SELECTING CONTENT ITEMS FOR PRESENTATION TO A SOCIAL NETWORKING SYSTEM USER IN A NEWSFEED

BACKGROUND

This disclosure relates generally to social networking systems, and in particular to providing content of a social networking system across multiple user devices.

In recent years, users of social networking systems have shared their interests and engaged with other users of the social networking systems by sharing photos, real-time status updates, and playing social games. The amount of information gathered from users is staggering—information describing a variety of "newsworthy" items, including recent moves to a new city, graduations, births, engagements, marriages, and the like, as well as more mundane content such as status messages, information about what music has been listened to by users, and recent check-in events at coffee shops. As users become more connected with other users and entities on the social networking system, the number of content items provided to the users increases exponentially. Existing social networking systems have ordered content items in reverse chronological order such that newly published content is displayed first. However, as a result of a flood of content items published on social networking systems, users may be exposed to irrelevant and uninteresting content while missing more relevant content that was previously presented.

Social networking systems may rank content items based on user interests and affinities for other users, but providing a continuous and chronological stream of content to users may effectively obscure more interesting and relevant content items among less interesting content items that have been more recently published. Because users may load a page of a social networking system without reading content items provided on the page, interesting and relevant content items may never be seen by the users. As a result of a decline in the user experience, users may become less engaged with the social networking system.

Specifically, users of social networking systems do not have an effective tool to indicate whether content items have been read or otherwise consumed. Providing users with efficient methods of consuming content items on a social networking system is valuable in providing a better user experience for users. As a result of consumption of content items, highly targeted contextual advertising may further provide valuable advertising revenue to the social networking system. However, existing systems have not provided users with tools or methods of managing the consumption of numerous incoming content items. Existing systems also have not solved the problem of reducing latency with respect to presentation of stories while maintaining consistency of presented stories across multiple user devices.

SUMMARY

A social networking system presents a viewing user with a newsfeed including content items such as of stories describing actions performed by other social networking system users and/or advertisements. To reduce latency in providing the newsfeed to the viewing user through a user device, the social networking system provides a ranked set of newsfeed stories to the user device that have been previously provided to the user device. The user device locally stores the ranked set of newsfeed stories upon receipt. Locally storing the newsfeed stories allows the user device to quickly present the viewing user with newsfeed stories when requested. When a user requests to access the newsfeed, a most recent or current ranked set of content items locally stored by the user device is presented to the user via the user device. When the current ranked set of newsfeed stories is presented to the user, the user device sends a request to the social networking system to update a view state of the user to identify the content items provided for presentation to the user and the order in which content items were presented. The view state also identifies content items provided for presentation to the user that were viewed by the user via the user device. This "locks" the order in which content items are presented to the user with respect to the viewing user.

However, when content items are presented to a user, the user may not view certain content items included in the news feed. For example, the user may not scroll a display to view content items included in the news feed or may not have a web browser or mobile application active for at least a specified time interval. Thus, while content items may be provided to the user device in an order for presentation to the user, but a lack of user interaction may prevent the user from viewing certain content items. However, content items included in a news feed but not viewed by the user may be relevant to the user, but are less likely to be viewed by the user if new content items are continually provided to the user device for presentation. For example, an advertisement included in the news feed may not be viewed by the user when initially included in a news feed presented to the user, so presenting additional content items to the user may prevent the user from viewing and/or interacting with the advertisement.

To increase the likelihood of the user viewing content items previously provided to the user device but not viewed from the user, when the social networking system receives a request for content items to present to the user, the view state associated with the user is retrieved. As the view state identifies content items provided to the user as well as provided content items viewed by the user, the social networking system identifies content items previously provided to the user but not viewed by the user based on the view state associated with the user. Additional content items whose state has changed since presentation of the one or more content items to the user are also identified. Content items previously presented to the user but not viewed by the user and having at least a threshold relevance to the user are identified. For example, content items associated with additional users to which the user has at least a threshold affinity or content items provided to the user device at least a threshold time from a current time are retrieved. The previously presented but not viewed content items with at least a threshold relevance to the user are ranked along with the additional content items. From the ranking, content items are selected and communicated to the user device for presentation to the user.

BRIEF DESCRIPTION OF THE DRAWINGS

FIGS. 6A and 6B are examples of a user interface of a process of selectively providing content to a viewing user of a social networking system, in accordance with an embodiment.

Figure 1:
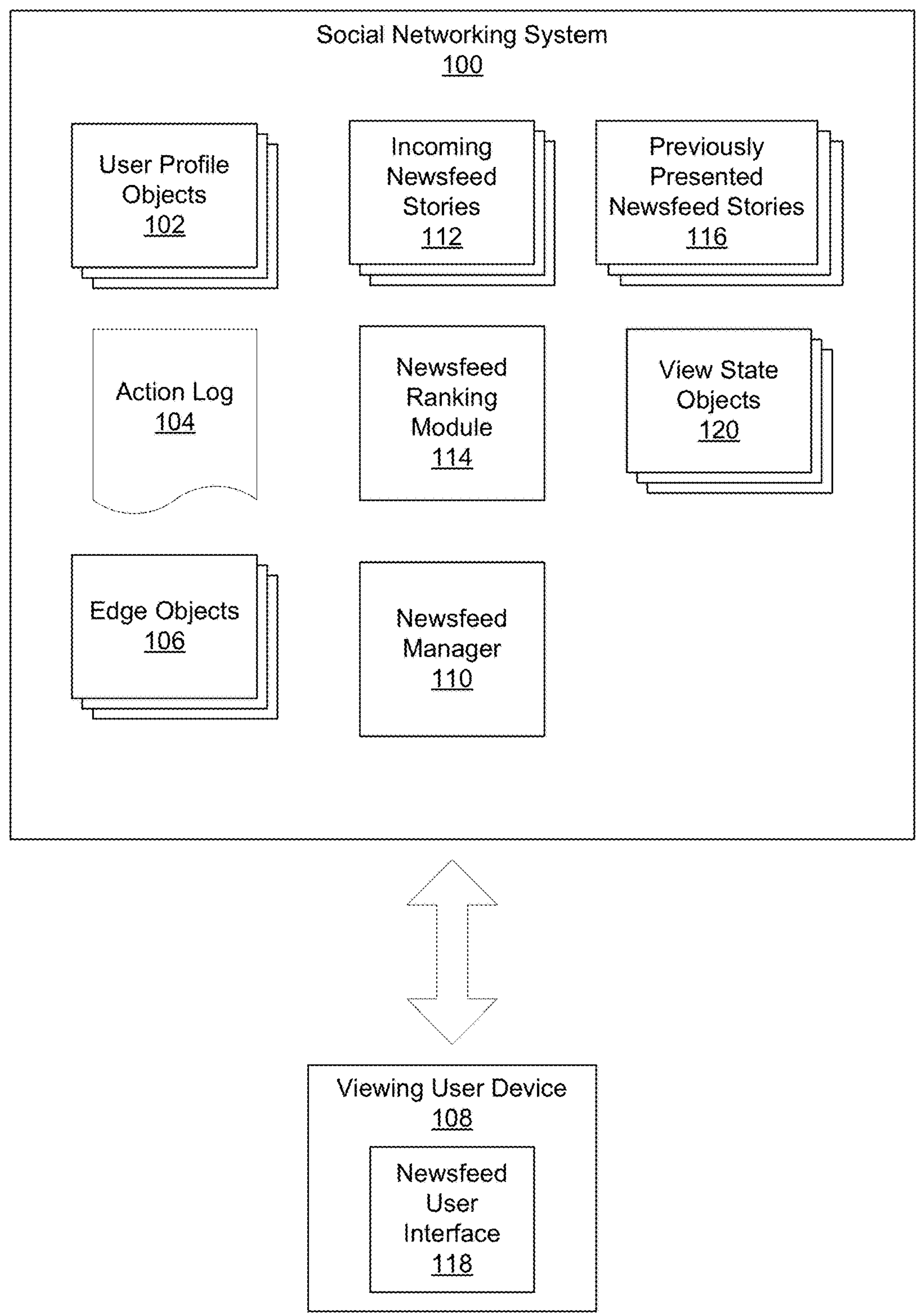
FIG. 1 is high level block diagram illustrating a process of selectively providing content in a social networking system, in accordance with an embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them, which is stored as user profiles. For example, users can provide their age, gender, geographical location, education history, employment history and the like. The information provided by users may be used by the social networking system to direct information to the user. For example, the social networking system may recommend social groups, events, and potential friends to a user.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

A social networking system may also attempt to infer information about its users. A social networking system may analyze posted content by users that include keywords, such as "wedding." Location information may be gathered from content items posted by users to infer a home location of the user. As a result, a social networking system may infer certain profile attributes of a user, such as geographic location, educational institutions attended, and age range, by analyzing the user's connections and their declared profile information. Inferring profile attributes are further discussed in "Inferring User Profile Information," U.S. application Ser. No. 12/916,322, filed on Oct. 29, 2010, which is hereby incorporated by reference.

A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests. In one embodiment, a social networking system may compute affinity scores for users' interests either explicitly expressed or otherwise inferred on the social networking system and use these affinity scores in ranking new content items that will be published in newsfeeds, or communication channels on the social networking system, for the users. Newsfeed rankings based on affinity scores are further discussed in related applications, "Adaptive Ranking of Newsfeed in Social Networks," U.S. application Ser. No. 13/194,770, filed on Jul. 29, 2011 and "Ranking Newsfeed Based on Social Graph Information," U.S. application Ser. No. 13/194,773, filed on Jul. 29, 2011, both which are hereby incorporated by reference.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference.

Even though a social networking system may collect, and in some cases infer, information about its users, significant resources must be expended to organize the staggering amounts of data collected. A social networking system having hundreds of millions of users, for example, gathers and infers a staggering amount of information about its users. To address issues of scalability and efficiently expending computing resources, a social networking system provides a snapshot of databases for modules to process. Recent changes in a user's personal life, such as an engagement, birth of a child, moving across the country, graduating from college, and starting a new job, can be collected and inferred from these snapshots on social networking systems. Content items related to these life events may be prioritized in a ranking of newsfeed stories selectively provided to users to ensure that the most relevant information is consumed first, in one embodiment.

As users accumulate more connections on a social networking system, newsfeeds, or the communication channels used by the social networking system to communicate content posted by the users' connections, have the potential to become inundated and clogged with irrelevant information. Ranking content items according to users' interests and affinities for other users may help to mitigate this problem. However, a social networking system may be unable to determine whether users that engage with the social networking system often, even multiple times a day with different devices associated with the same user profile, have finished viewing the content items already provided. Often times, a user may load a web page on the social networking system and inadvertently overlook a particularly engaging content item posted by another user connected to the user. This leads to less user engagement on the social networking system.

Social networking systems strive to keep their users engaged by delivering relevant content as soon as users are able to consume the content. Determining whether users are ready to view more content, especially as users accumulate hundreds and even thousands of "friends" on the social networking system, is valuable to ensuring that users remain engaged with the social networking system without inundating their newsfeeds with irrelevant content. Machine learning and heuristics analysis may be used in selectively providing content to users of a social networking system.

FIG. 1 illustrates a high level block diagram of a process for selectively providing content to users of a social networking system, in one embodiment. The social networking system 100 uses different types of information about users in the process of selectively providing content to users, including user profile objects 102, an action log 104, and edge objects 106. Each user of the social networking system 100 is associated with a specific user profile object 102. These user profile objects 102 include declarative information about the user that was explicitly shared by the user as well as any profile information inferred by the social networking system 100. In one embodiment, a user profile object 102 may include thirty or more different data fields, each data field describing an attribute of the corresponding user of the social networking system 100.

Users of the social networking system 100 may take actions using the social networking system 100 that are associated with one or more objects. Information describing these actions is stored in the action log 104. The action log 104 includes many different types of interactions that occur on a social networking system, including commenting on a photo album, communications between users, becoming a fan of a musician, and adding an event to a calendar. Additionally, the action log 104 records a user's interactions with advertisements on the social networking system 100 as well as other applications operating on the social networking system 100.

Edge objects 106 store information about users' connections to other nodes on a social networking system 100. Such information may include the interactions between the user and the connection on the social networking system 100, including wall posts, comments on photos, geographic places where they have been tagged together, and photos in which they have both been tagged in. In one embodiment, an edge object 106 includes information about the strength of the connection between the users, such as an affinity score. If a user has a high affinity score for a particular connection, the social networking system 100 has recognized that the user interacts highly with that connection. Affinity scores and methods of gathering this social data from a social networking system are described further in "Contextually Relevant Affinity Prediction in a Social Networking System," U.S. application Ser. No. 12/978,265, filed on Dec. 23, 2010, which is hereby incorporated by reference.

A viewing user device 108 may connect with the social networking system 100 and request content in a newsfeed user interface 118. A newsfeed manager 110 responds to the request from the viewing user device 108 by first determining previously presented newsfeed stories 116 for the user associated with the viewing user device 108. Incoming newsfeed stories 112 for the user associated with the viewing user device 108 are determined and then ranked by a newsfeed ranking module 114. The top incoming newsfeed stories 112 may be selected by the newsfeed manager 110 and displayed in the newsfeed above the remaining incoming newsfeed stories 112. The newsfeed ranking module 114 may use information about the user associated with the viewing user device 108 to determine the ranking of content items in the newsfeed for the user. This user information may be obtained from user profile objects 102, edge objects 106, and actions stored in the action log 104 associated with the user.

The newsfeed manager 110 may then provide previously presented newsfeed stories 116 below the incoming newsfeed stories 112 for rendering in the newsfeed user interface 118 based on received user input that indicates the user has finished consuming the previously presented newsfeed stories 116. As a result, the viewing user will see the top new stories first, followed by the remaining new stories, and then the previously presented newsfeed stories. Such user input may include clicking on, or otherwise selecting, a link in the newsfeed user interface 118 for more stories, detecting a scroll action from the viewing user device 108, receiving clicking actions on various content items in newsfeed user interface 118, and an elapsed time spent on the newsfeed user interface 118 after loading the newsfeed user interface 118 on the viewing user device 108.

The newsfeed manager 110 records, for each user on the social networking system 100, a "view state" of the newsfeed stories that have been presented in each user's newsfeed, storing the order of the stories that have been presented. The view state at a particular time may be stored in a view state object 120 associated with the user. Using this view state, the newsfeed manager 110 may determine whether newsfeed stories have evolved, changing the ranking of the newsfeed stories. For example, a viewing user may be connected to another user that shared a link about a news story about Christmas shopping. The viewing user may express interest in this link by sharing the news story with other users connected to the viewing user, commenting on the news story, or "liking" the news story. Later, other users connected to the viewing user may further interact with the news story or may post other stories related to the topic of the news story about Christmas. The newsfeed ranking module 114 may rank the news story higher as a result of users with high affinities interacting with the newsfeed story. Because these interactions have evolved the previously presented news story 116, the news story may be presented to the viewing user as an incoming newsfeed story 112 by the newsfeed manager 110. In addition, the newsfeed manager 110 may cluster the newsfeed stories about Christmas into one newsfeed story, showing the newer interactions by other users.

The newsfeed manager 110 may, in one embodiment, use machine learning methods to selectively provide new content to users of the social networking system 100. Each user on the social networking system 100 may have different affinities for other users on the social networking system 100, interests and concepts embodied as nodes on the social graph of the social networking system 100, and applications that may be installed on the social networking system 100. Content items produced by these users, interests, concepts, and applications have the potential to flood users with irrelevant information, effectively hiding more relevant items. Machine learning may be used to predict which content items are more relevant for users as well as when users may be ready to consume new content items by analyzing user behaviors on the social networking system.

As a viewing user device 108 loads a newsfeed user interface 118, the newsfeed manager 110 may render a link in the newsfeed user interface 118 to indicate a number of new stories that have been accumulated. In this way, the user may read and/or consume top stories that have been posted since the last time the user logged in. In one embodiment, the newsfeed manager 110 may determine that the user associated with the viewing user device 108 is actively engaged with the newsfeed interface 118 and may automatically update the newsfeed user interface 118 with top incoming newsfeed stories 112 as ranked by the newsfeed ranking module 114. In another embodiment, the newsfeed manager 110 may determine that a top incoming newsfeed story 112 warrants automatically updating the newsfeed user interface 118 for the user based on past user behaviors. In a further embodiment, the newsfeed manager 110 may update the link in the newsfeed user interface 118 to indicate an updated number of new stories that have been accumulated and await user input, such as a mouse click, a touchpad input, voice input, gesture input, or keyboard input, to execute the link and display the new incoming newsfeed stories 112. A "click" action may be defined as any user input used to select and execute a link.

In one embodiment, the newsfeed manager 110 may dynamically render the previously presented newsfeed stories 116 and incoming newsfeed stories 112 in a ranking determined by the newsfeed ranking module 114 based on user input received, or lack of receipt, from the newsfeed user interface 118 on the viewing user device 108. For example, a user may access a social networking system 100 through a viewing user device 108 in the morning and browse through content items that are provided in the newsfeed user interface 118. Once provided in the newsfeed user interface 118, the order of the previously presented newsfeed stories 116 is stored as the user's view state at that time in a view state object 120 associated with the viewing user. The user may then browse on other sites on the viewing user device 108 and leave the newsfeed user interface 118 open, where the newsfeed user interface 118 is embodied on a web page loaded by a web browser or on a native application on a mobile device. Later that afternoon, the user may again access the social networking system 100 through the viewing user device 108 to either continue browsing previously presented newsfeed stories 116 or new incoming newsfeed stories 112. As described above, the newsfeed manager 110 may render a link in the newsfeed user interface 118 to indicate that incoming newsfeed stories 112 are available. The user may click on the link to view the new incoming newsfeed stories 112. This user input may cause the newsfeed manager 110 to provide for display in the newsfeed user interface 118 the incoming newsfeed stories 112 as ranked by the newsfeed ranking module 114 above the previously presented newsfeed stories in the order stored in the user's view state that morning retrieved from the view state object 120 associated with the user.

Alternatively, the user may never click on that link to display the incoming newsfeed stories 112. In that case, the newsfeed manager 110 may continue holding the incoming newsfeed stories 112 while refreshing the link that indicates an increasing amount of new stories. On the other hand, the newsfeed manager 110 may automatically refresh the newsfeed user interface 118 to display the incoming newsfeed stories 112 with the previously presented newsfeed stories 116. In one embodiment, the newsfeed ranking module 114 may rank a new incoming newsfeed story 112 below a previously presented newsfeed story 116 because the previously presented newsfeed story 116 may have been highly interacted with by other users connected to the viewing user, may have evolved by the original publishing user commented on the previously presented newsfeed story 116, or may be of high interest to multiple users connected to the viewing user. As a result, the incoming newsfeed stories are selectively provided to the viewing user based on information gathered about that user as well as the view state of the newsfeed for that user.

System Architecture

Figure 2:
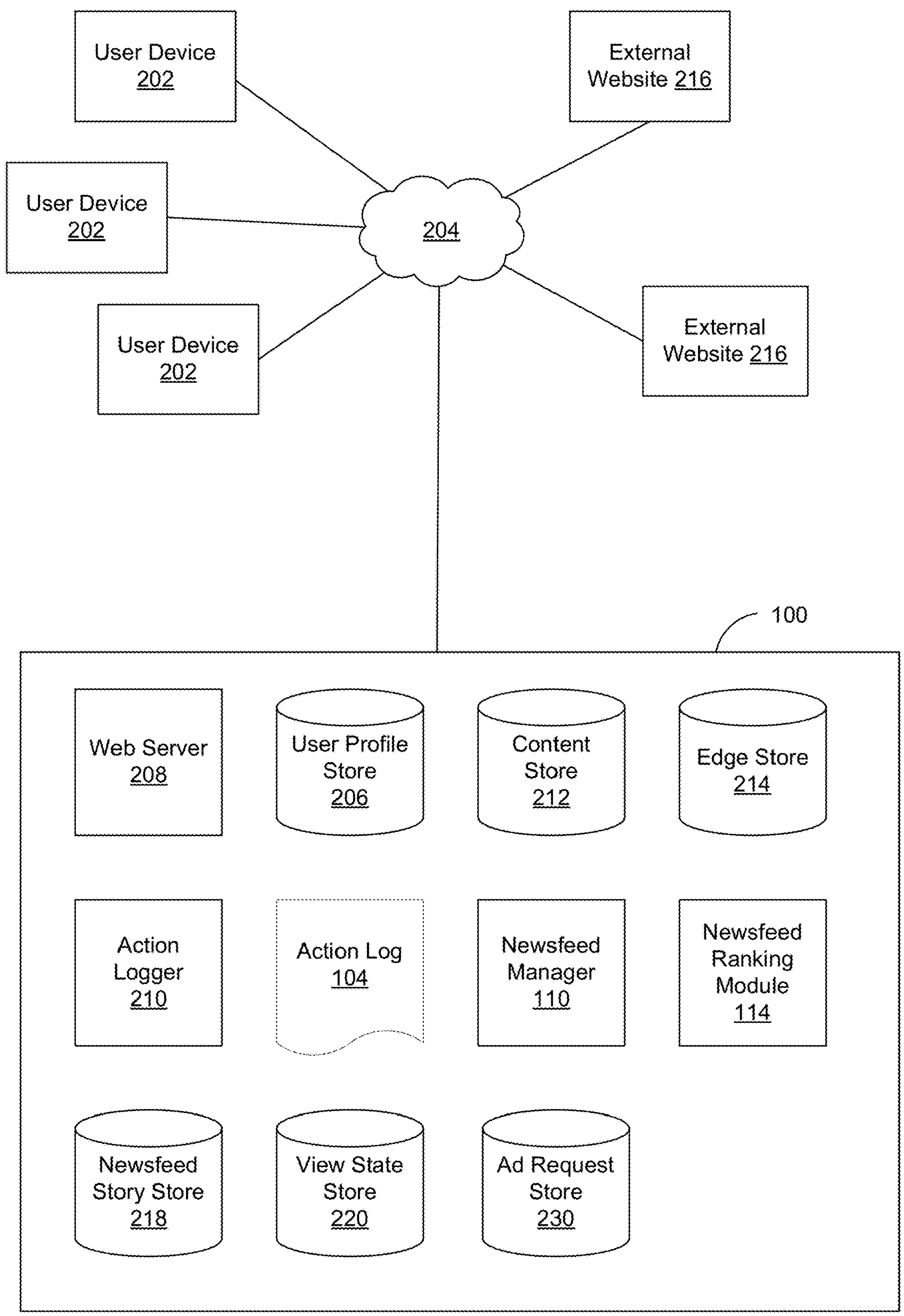
FIG. 2 is a network diagram of a system for selectively providing content in a social networking system, showing a block diagram of the social networking system, in accordance with an embodiment.

FIG. 2 is a high level block diagram illustrating a system environment suitable for selectively providing content to users of a social networking system, in accordance with an embodiment. The system environment comprises one or more user devices 202, the social networking system 100, a network 204, and external website 216. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as IOS® and ANDROID™.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, an action log 104, a content store 212, an edge store 214, a newsfeed manager 110, a newsfeed ranking module 114, a newsfeed story store 218, a view state store 220, and an ad request store 230. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as IOS®, ANDROID™, WEBOS®, and BlackberryOS.

The action logger 210 is capable of receiving communications from the web server 208 about user actions on and/or off the social networking system 100. The action logger 210 populates the action log 104 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in an action log 104.

An action log 104 may be used by a social networking system 100 to track users' actions on the social networking system 100 as well as external websites that communication information back to the social networking system 100. As mentioned above, users may interact with various objects on the social networking system 100, including commenting on posts, sharing links, and checking-in to physical locations via a mobile device. The action log 104 may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log 104 records data about these users, including viewing histories, advertisements that were clicked on, purchasing activity, and buying patterns.

User account information and other related information for users are stored as user profile objects 102 in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100 in edge objects 110. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

A newsfeed manager 110 selectively provides content to users of a social networking system 100 and records the consumption of content by users using view state objects 120 for the users of the social networking system 100. View state objects 120 are stored in the view state store 220 and are associated with user profile objects 102 stored in the user profile store 206. As new newsfeed stories are generated for a user by the newsfeed manager 110, the newsfeed stories are ranked by the newsfeed ranking module 114 and stored in the newsfeed story store 218. The newsfeed manager 110 may communicate with user devices 202 through the web server 208 and network 204 to provide content to users of the social networking system 100. In one embodiment, a newsfeed manager 110 may provide content through a social plug-in, such as an iFrame, to an external website 216 to provide content posted on the social networking system 100 about an entity associated with the external website 216. As an example, a business entity that creates a page on the social networking system 100 may desire to publish the content items posted on the page's newsfeed in the social networking system to an external website 216 via a social plug-in installed on the external website 216.

One or more advertisement requests ("ad requests") are included in the ad request store 230. An advertisement request includes advertisement content (also referred to as an "advertisement") and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 100 if the advertisement is presented to a user, if the advertisement receives a user interaction, or based on any other suitable condition. For example, the bid amount specifies a monetary amount that the social networking system 100 receives from the advertiser if the advertisement is displayed and the expected value is determined by multiplying the bid amount by a probability of the advertisement being accessed by a user.

Additionally, an advertisement request may include one or more targeting criteria specified by the advertiser. Targeting criteria included in an advertisement request specify one or more characteristics of users eligible to be presented with advertisement content in the ad request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 100. Targeting criteria may also specify interactions between a user and objects performed external to the social networking system 100, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

Providing Content to Users of a Social Networking System

Figure 3:
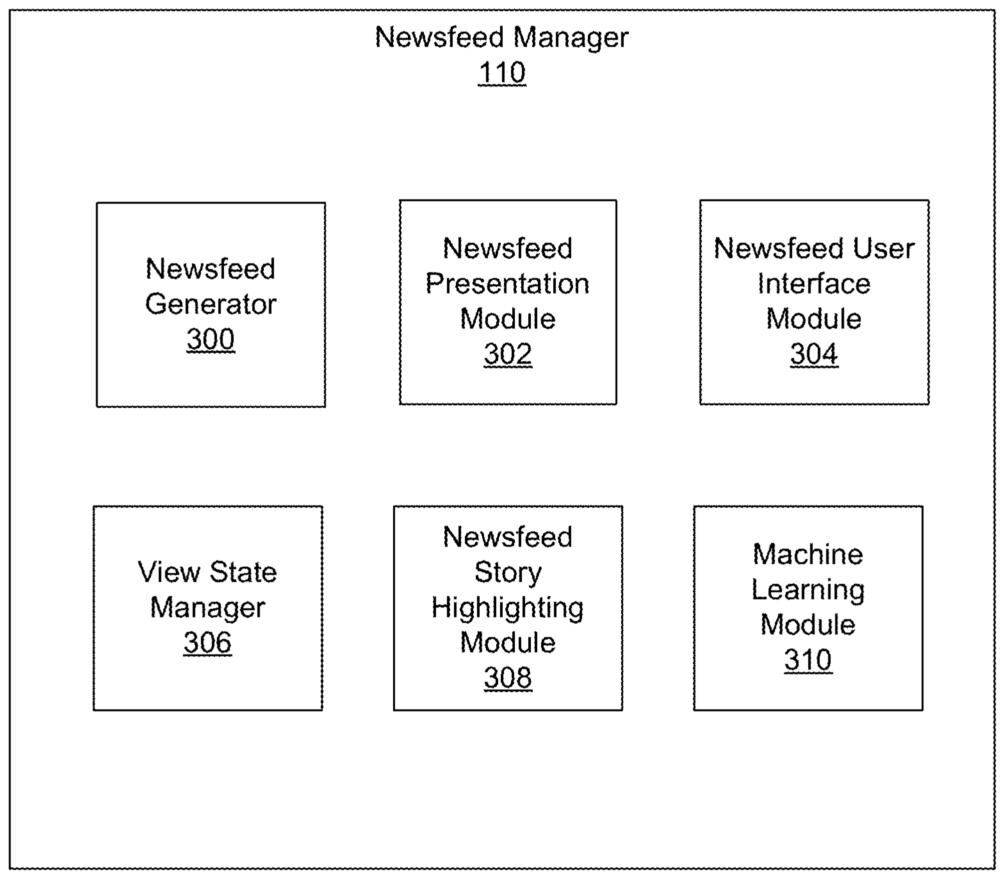
FIG. 3 is high level block diagram illustrating a newsfeed manager that includes various modules for managing content provided to users of a social networking system, in accordance with an embodiment.

FIG. 3 illustrates a high level block diagram of the newsfeed manager 110 in further detail, in one embodiment. The newsfeed manager 110 provides the functionality for managing activities related to newsfeed including, generating the newsfeed stories, selecting the newsfeed stories for presentation to users of the social networking system 100, retrieving a ranking of the newsfeed stories identified for presentation to a user, and presenting the newsfeed stories via the newsfeed user interface 118. A newsfeed story may describe objects represented in the social networking system, for example, an image, a video, a comment from a user, status messages, external links, content generated by the social networking system, applications, games, or user profile. The newsfeed manager 110 includes a newsfeed generator 300, a newsfeed presentation module 302, a newsfeed user interface module 304, a view state manager 306, a newsfeed story highlighting module 308, and a machine learning module 310. These modules may perform in conjunction with each other or independently to selectively provide content to users of a social networking system 100.

The newsfeed generator 300 module generates newsfeed stories for presentation to users of the social networking system 100. The user to whom a newsfeed story is presented is referred to as a viewer of the newsfeed story. In an embodiment, the newsfeed generator 300 analyzes information stored in the action log 104 to identify information useful for generating newsfeed stories. The newsfeed generator 300 identifies actions stored in action log 104 that are likely to be of interest to viewers and extracts information describing these actions from the action log 104 to generate incoming newsfeed stories 112. Alternatively, the newsfeed generator 300 can obtain information describing actions from other modules, for example, from the action logger 210, or other run time modules that implement functionality for performing different types of actions. For example, if a user uploads an image to the social networking system 100, the module executing the code for uploading the image can inform the newsfeed generator 300 of the action so that the newsfeed generator 300 can generate a newsfeed story describing the action. In one embodiment, the newsfeed generator 300 may retrieve advertisement content from the ad request store 230, allowing advertisement content to be included in a newsfeed presented to a user along with news feed stories.

The newsfeed generator 300 may determine that certain actions are not likely to be of interest to users for reporting as incoming newsfeed stories 112. For example, a user hiding a comment posted by another user or a user changing certain types of user preferences may not be of interest to other users and is therefore not reported in newsfeed stories. However, other changes made by a user to the user's profile may be considered interesting for other users, for example, a change in relationship status of a user. The newsfeed generator 300 may not generate newsfeed stories based on certain actions as a matter of policies enforced by the social networking system 100. For example, a user viewing user profile of another user or a user sending a private message to another user may not be presented as newsfeed stories due to privacy concerns. Furthermore, the newsfeed generator 300 may consider privacy settings of individual users to determine whether certain actions of a user can be presented as newsfeed stories to other users. A user may set the user's privacy settings to limit the set of people to whom newsfeed stories describing the user's actions may be sent. For example, a user may allow only connections of the user to receive information describing the users' actions, whereas another user may allow connections of the user's connections to receive the information. A user may restrict the types of actions that are reported as newsfeed stories. For example, the user may specify that certain actions, for example, adding a new connection may not be reported as newsfeed stories.

In an embodiment, the newsfeed generator 300 stores generated newsfeed stories in the newsfeed story store 218.

The newsfeed story store 218 may be represented as a database that links various objects related to the newsfeed stories. Each newsfeed story stored in the newsfeed story store 218 can be associated with other entities in the social networking system 100. For example, a newsfeed story may be associated with one or more users that performed an action described in the newsfeed story as well as with a representation of the video in the social networking system 100. The users that performed the actions described in the newsfeed story are called the actors. For example, if the newsfeed story describes a comment posted by John on a video posted by Jack, both John and Jack can be considered actors of the newsfeed story. As another example, a newsfeed story describing a comment posted by a user in response to another user's wall post may be associated with both the user who posted the message on the wall and the user who posted the comment.

A newsfeed presentation module 302 provides generated content items, or newsfeed stories, for display on newsfeed user interfaces 118 on viewing user devices 108. The newsfeed presentation module 302 determines the newsfeed stories to be presented to a user and provides the stories selected for presentation to the newsfeed user interface module 304. The newsfeed user interface module 304 presents the selected newsfeed stories to the newsfeed user interface 118 on a viewing user device 108. The newsfeed presentation module 302 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The newsfeed presentation module 302 uses the newsfeed ranking module 114 to rank the newsfeed stories being presented to the user.

The newsfeed presentation module 302 may present a subset of the stories based on the rank, for example, the top 10 stories, depending on the display area available on the newsfeed user interface 118 for presenting the stories. The newsfeed presentation module 302 presents the stories in the order determined by the ranking, for example, stories ranked higher may be presented more prominently compared to stories ranked lower. In an embodiment, the stories ranked higher are presented above the stories ranked lower. In a further embodiment, the remaining incoming stories not selected as the "top" stories may be presented in a chronological order after the top stories. In other embodiments, stories ranked higher may be presented more prominently by displaying them using an appropriate text color, font, text size, back ground color, etc.

A view state manager 306 operates independently and asynchronously from the other modules in the newsfeed manager 110. The view state manager 306 determines when to capture a view state of the newsfeed for each user of a social networking system 100. A viewing user may login to a social networking system 100 to start a new viewing session. Throughout the session, incoming newsfeed stories 112 may be provided to a viewing user, and as a result, the view state for the viewing user has changed. The view state manager 306 may determine that, after each newsfeed story is published to or presented over a user's newsfeed, the view state should be updated in the view state object 120. The view state object 120 is stored in a view state store 220 which may be embodied in super fast memory, in one embodiment. In one embodiment, the view state is updated when a user's session expires. The session may expire based on a lack of engagement with or activity on the social networking system 100 by the user. For example, a user may open a web browser on a user device 202 to connect to the social networking system 100. After browsing newsfeed stories, the user may open another browser window to view other web pages not connected to the social networking system 100. In one embodiment, the session created when the user first connected with the social networking system 100 will expire based on a predetermined time period of non-activity elapsing. In another embodiment, the viewing session expires when the user logs out of the social networking system 100. When a session expires, the view state, which includes an order of newsfeed stories and indications of whether newsfeed stories were featured or highlighted as a top story, is stored in the view state object 120 associated with the user.

Using the view state manager 306, the newsfeed manager 110 may determine that the user is not yet ready to read or consume more newsfeed stories. For example, if a user starts a new session but does not scroll down the newsfeed, as detected by the newsfeed user interface module 304, then the newsfeed manager 110 may assume that the user has not yet read the newsfeed stories provided on the newsfeed user interface. If that user later starts another session, the previously presented newsfeed stories 116 remain frozen on the newsfeed user interface using the view state previously stored by the view state manager 306. A link may be rendered by the newsfeed user interface module 304 to indicate that incoming newsfeed stories 112, generated by the newsfeed generator 300 and ranked by the newsfeed ranking module 114, are available for consumption without presenting the new incoming newsfeed stories 112. In one embodiment, the link includes a number of incoming newsfeed stories 112 that are available. This number may be dynamically updated in real-time as new newsfeed stories are generated by the newsfeed generator 300. In another embodiment, the newsfeed user interface module 304 may include a preview of the new incoming newsfeed stories 112 that are available for consumption without publishing the incoming newsfeed stories 112 and changing the view state.

In a further embodiment, the newsfeed manager 110 may infer that a user has finished consuming or reading the newsfeed stories that are presented upon loading the newsfeed user interface on a user device 202. In that case, the incoming newsfeed stories 112 may be automatically rendered and presented by the newsfeed presentation module 302 upon creation by the newsfeed generator 300 and ranking by the newsfeed ranking module 114. The view state would also be updated by the view state manager 306. In yet another embodiment, the newsfeed manager 110 may hold the incoming newsfeed stories 112 behind a link rendered by the newsfeed user interface module 304 unless or until a top story has been generated by the newsfeed generator 300 and ranked by the newsfeed ranking module 114. The top new news story may have a prediction score, determined by the newsfeed ranking module 114, that exceeds a predetermined threshold to cause the newsfeed manager 110 to publish the top news story without determining that the viewing user is ready to consume more stories.

A newsfeed story highlighting module 308 selects newsfeed stories that have been highlighted by the newsfeed ranking module 114 as highly relevant stories for a viewing user. Highlighted stories may be displayed in a newsfeed more prominently above other newsfeed stories and may also be rendered in a different color or background to denote that the stories have been highlighted. The newsfeed story highlighting module 308 may also, in one embodiment, combine newsfeed stories that are about the same topic or refer to the same link. For example, the newsfeed story highlighting module 308 may analyze keywords that are included in content items that posted on the social networking system 100, such as "Christmas," and combine those newsfeed stories into a condensed newsfeed story that is highlighted for the viewing user to see on their newsfeed. This enables the viewing user to browse through a newsfeed more efficiently by combining redundant and similar posts. In another embodiment, a separate newsfeed process groups these redundant and similar posts into a single combined post and operates in conjunction with the newsfeed story highlighting module 308 to highlight the combined post on the newsfeed.

In one embodiment, the newsfeed story highlighting module 308 may include programmable logic, or instructions, to ensure that a newsfeed story that was posted by another user or entity connected to the viewing user is highlighted, based on the affinity score for that user. For example, if a viewing user is highly interested in newsfeed stories posted by another user on the social networking system 100, such as the viewing user's wife, based on user profile information, interactions with that user, as well as content posted by that user, then the newsfeed story highlighting module 308 may be configured to highlight all newsfeed stories published by that user. In one embodiment, a viewing user may interact with the newsfeed user interface to indicate that a newsfeed story should be highlighted. In doing so, the newsfeed story highlighting module 308 may better understand what types of newsfeed stories appeal to the viewing user. Similarly, the viewing user may indicate that a highlighted story should not be highlighted by interacting with the newsfeed user interface.

In another embodiment, the newsfeed story highlighting module 308 may generate a prediction model for each user on the social networking system 100 to predict which newsfeed stories should be highlighted based on a number of factors, including the authoring user of the newsfeed story, the topic of the newsfeed story, the type of content included in the newsfeed story, applications that have published the newsfeed story, reputation metrics of users that have published the newsfeed story, and a virality metric of the newsfeed story. A prediction model may, over time, adjust weights for these factors depending on user interactions that differ from user to user. Machine learning methods may be used to optimize the prediction models to be specific to each viewing user, in one embodiment. In this way, viewing users with differing affinities for different types of content items may have more personalized newsfeeds.

A machine learning module 310 may be used in the newsfeed manager 110 to refine the predictive models and select the predictive factors used for selecting highlighted newsfeed stories. In one embodiment, a social networking system 100 uses a machine learning algorithm to analyze user interactions with highlighted stories to retrain the predictive model. Using feedback from the user interactions indicating whether a newsfeed story should be highlighted, the predictive model may be refined to include more or less predictive factors and the weights assigned to each predictive factor, or coefficients, can also be adjusted based upon the response, i.e., the user interactions with the highlighted stories.

In another embodiment, the machine learning module 310 may be used to determine whether a previously presented newsfeed story, such as a shared link to a video, may evolve into a new incoming newsfeed story based on other users sharing the link, commenting on the link, or otherwise interacting with the link. For example, if a very close friend of a viewing user, as determined from an affinity score for the user profile object for the very close friend, shared the link that was previously presented on the viewing user's newsfeed, the previously presented newsfeed story may be combined into a single newsfeed story that includes the other users that have shared the link, including the very close friend and his comments about the link, if any. The machine learning module 310 may be used to determine, in conjunction with the newsfeed story highlighting module 308, whether such stories should evolve and be presented to the viewing user again.

Figure 4:
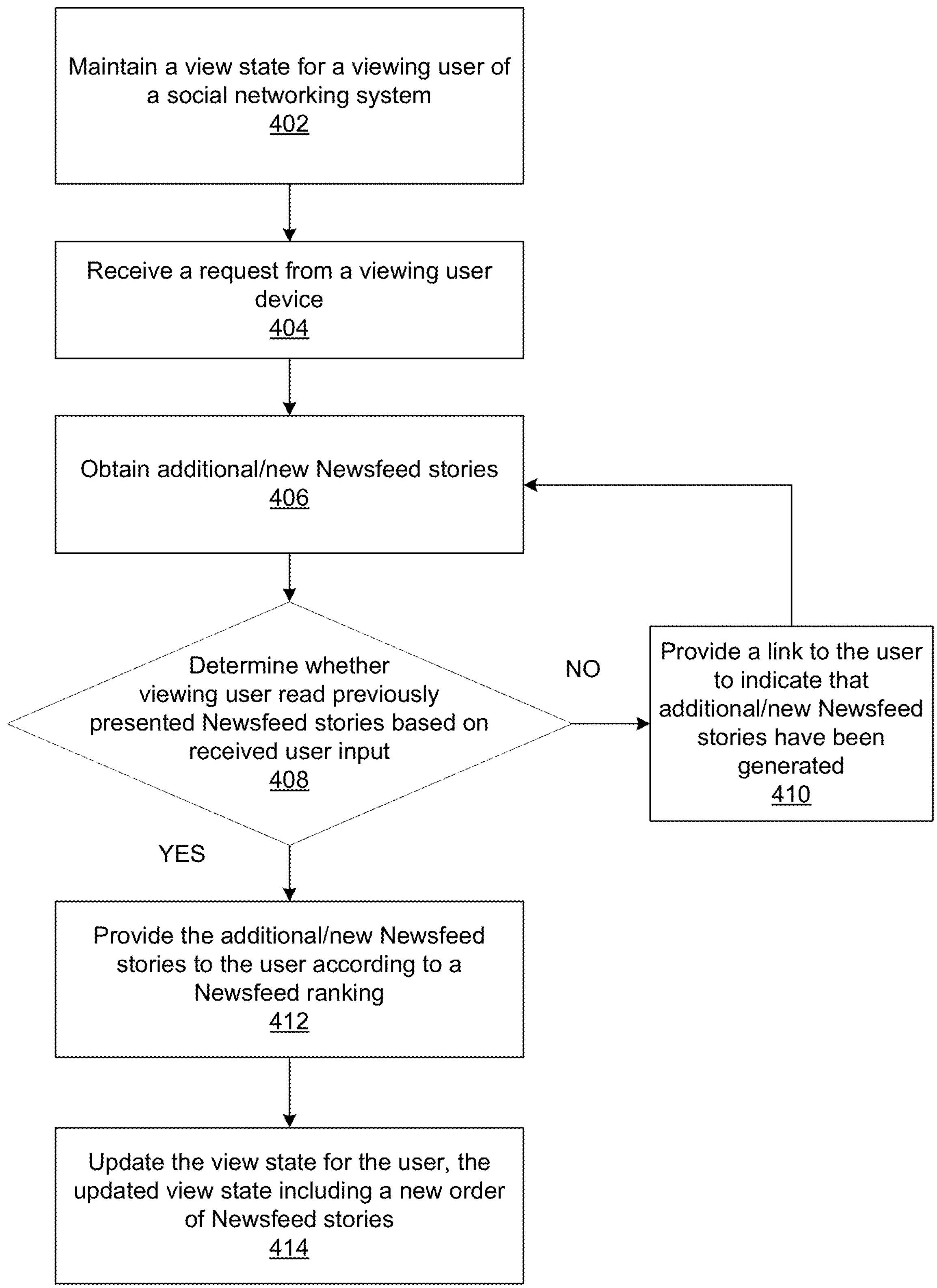
FIG. 4 is a flowchart of a process of selectively providing content to a viewing user of a social networking system, in accordance with another embodiment.

FIG. 4 illustrates a flow chart diagram depicting a process of selectively providing content to a viewing user of a social networking system, in accordance with an embodiment. A view state for a user of a social networking is maintained 402, where the view state includes an order of news feed stories provided to the user. The view state for a user may be stored in a view state object 120 associated with a user profile object 102 for the user each time new news feed stories are provided to the user. The view state may be maintained 402 over time to store the order in which news feed stories have been presented to the user, regardless of the user device on which the user interacts with the news feed stories.

A request for new news feed stories may be received 404 from the user. This request may be in the form of an application programming interface (API) call from a mobile device application that requests content for a news feed user interface on the user device, in one embodiment. In another embodiment, the request may be received 404 as a web page request for content in a news feed user interface on the browser window operating on the user device.

Once a request for new news feed stories has been received 404, new news feed stories are obtained 406. The news feed generator 300 in the news feed manager 110 may generate new news feed stories and hold them in a queue to be presented to the viewing user. The new news feed stories may be obtained from this queue, in one embodiment. In another embodiment, new news feed stories may be generated upon receiving 404 the request from the user. In a further embodiment, a news feed ranking module 114 may identify a top news feed story for the news feed story highlighting module 308. As a result, the top news feed story is obtained 406 as a new news feed story. This new news feed story may, in one embodiment, include a plurality of news feed stories that have been combined into a single news feed story. Remaining new news feed stories, other than the selected top news feed stories, are also obtained 406.

After new news feed stories are obtained 406, the social networking system 100 determines 408 whether the user read the provided news feed stories based on received user input. If the social networking system 100 determines 408 that the user has not read the provided news feed stories based on received user input, then a link is provided 410 to the user to indicate that new news feed stories have been generated and new news feed stories are continuously obtained 406. User input that may indicate whether the user has read the provided news feed stories includes a scroll action on a web browser or mobile application, a click action on a link provided in a news feed story, and a refresh of the user interface on the web browser or mobile application. In one embodiment, no user input is needed, and if the web browser is active or the mobile application is open, the social networking system 100 may determine 408 that the user has read the provided news feed stories. In another embodiment, the social networking system 100 determines 408 that the user has read the provided news feed stories based on a predetermined time period elapsing.

After the social networking system 100 has determined 408 that the user has read the provided news feed stories, the new news feed stories are provided 412 to the user according to a news feed ranking. The new news feed stories are ranked by the news feed ranking module 114 and may be highlighted by the news feed story highlighting module 308 in the news feed manager 110. In one embodiment, the new news feed stories are provided 412 to the user according to a prediction model generated by the news feed story highlighting module 308 based on previous user interactions on the social networking system 100. In another embodiment, the news feed ranking may change dynamically, based on newly generated news feed stories. In a further embodiment, the top new news feed stories are provided in ranked order, followed by the remaining new news feed stories in a chronological order, such as reverse chronological order.

After the new news feed stories are provided 412 to the user, the view state for the user is updated 414, such that the updated view state includes a new order of the news feed stories provided to the user. The updated view state is stored in the view state object 120 associated with the user profile object 102 for the viewing user. The view state is used by the social networking system 100 to determine 408 whether the user has read the provided news feed stories, in one embodiment.

However, when content items are presented to a user via a news feed, the user may not read certain content items included in the news feed. For example, the user may not scroll a display to view content items included in the news feed or may not have a web browser or mobile application active for at least a specified time interval. Thus, content items may be ordered in the news feed but not read or presented to the user because of a lack of user interaction with the news feed. Certain content items included in a news feed but not viewed by the user may be relevant to the user, but become less likely to be read or viewed by the user if new content items are presented before the previously presented and unread content items. For example, an advertisement included in the news feed may not be viewed by the user when initially included in a news feed presented to the user, presenting additional content items to the user may prevent the user from viewing and/or interacting with the advertisement.

Figure 5:
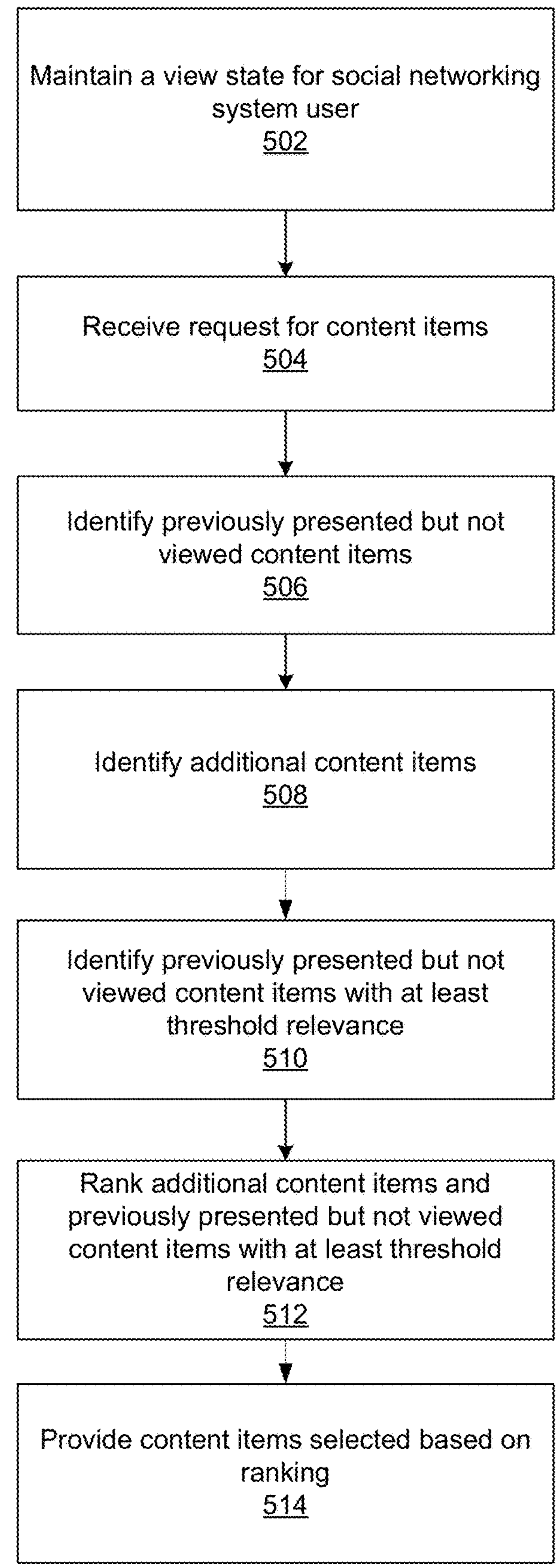
FIG. 5 is a flowchart of a method for selecting content items for presentation to a social networking system user, in accordance with an embodiment.

FIG. 5 shows one embodiment of a method for selecting content items to provide to a social networking system user. As used herein, "content items" refer to news feed stories, advertisement, or any combination thereof. A view state for a social networking system user is maintained 502. The view state identifies content items and an order in which the identified content items are presented to the user. For example, the view state includes an order in which identified content items are presented in a news feed to the user. The content items may include news feed stories and advertisements, allowing the news feed presented to the user to include both news feed stories and advertisements. In one embodiment, the view state for a user may be stored in a view state object 120 associated with a user profile object 102 for the user and modified each time content items are provided to the user. The view state may be maintained 502 over time to store the order in which content items have been presented to the user, even when the user interacts with content items via multiple user devices.

A request for content items is received 504 from the user. For example, an application programming interface (API) call from a mobile device application requesting content items for presentation to the user through a user interface presented by the user device is received 504. As another example, the request is received 504 as a web page request for content in a news feed user interface presented by a browser executing on the user device.

Based on the received request for content items, one or more content items previously provided to a user device for presentation to the user but not viewed by the user are identified 506. For example, the social networking system 100 determines if the user has viewed content items identified by the view state associated with the user as presented to the user. Content items identified as presented to the user by the view state but not viewed by the user are identified 506. In one embodiment, user input received from a user device indicates whether the user has viewed a content item provided for presentation. For example, an application executing on a user device indicates to the social networking system 100 that the user has viewed a content item when the application receives a scroll action, receives a click action on a link provided in a content item, or a refresh of the user interface presented by the application. As another example, if a web browser or mobile application is open, the social networking system 100 determines that the user has viewed the provided content items and identifies 506 content items as not viewed if the mobile application or web browser is not open. In another embodiment, the social networking system 100 identifies 506 content items as not viewed by a user if less than a specified time period has elapsed from the content items being provided to a user device.

In addition to identifying 506 content items previously provided to the user but not viewed by the user, one or more additional content items are identified 508. For example, new news feed stories are generated by the news feed generator 300 in the news feed manager 110 and maintained in a queue for presentation to the user. One or more news feed stories may be identified 508 from this queue as additional content items. Identification of news feed stories is further described above in conjunction with FIG. 4. In some embodiments, the identification of one or more of the additional content items may be based on state changes associated with content items that occur after the user viewed the one or more previously provided content items. A state change may indicate, for example, a new content item, a content item including a new like, a content item including a new share, a content item including a new comment, or some combination thereof. Additionally, one or more advertisements included in the ad request store 230 may be identified 508 as additional content items. For example, advertisements associated with one or more targeting criteria satisfied by the user are identified 508 from the ad request store as additional content items.

One or more of the content items identified as previously provided to the user but not viewed by the user having at least a threshold relevance to the user are identified 510. For example, content items with which the user has at least a threshold affinity are identified 510. As described above, affinity scores may be computed for various content items to provide a measure of the user's likely interest in the content items. The affinity scores may be based on the user's interactions with content items, objects associated with content items, or users associated with content items to represent the user's interest in an object or another user associated with the content item, and the user's affinity scores for content items previously provided to the user but not viewed by the user are compared to a threshold value to identify 510 previously provided content items with at least a threshold affinity score. In one embodiment, content items previously provided to the user but not viewed by the user include one or more advertisements, and advertisements provided to the user greater than a threshold time interval from a time when the request for content items was received but not viewed by the user are identified 510. Additionally, bid amounts associated with advertisements may be used to identify previously presented but not viewed advertisements; for example, previously presented advertisements that were not viewed and that have at least a threshold bid amount are identified 510.

The additional content items and the content items previously provided to the user but not viewed by the user having at least the threshold relevance to the user are then ranked 512 by the social networking system. In one embodiment, news feed stories in the additional content items and retrieved content items are ranked 512 based on the user's affinities for objects or users associated with the news feed stories, as described above in conjunction with FIG. 1. For example, affinity scores between the user and news feed stories are generated based on interactions between the user and a user or an object associated with a news feed story, interactions between other users connected to the user and a user or an object associated with a news feed story, or based on any suitable information.

In one embodiment, advertisements included in the additional content items and the content items previously provided to the user but not viewed by the user are ranked 512 based in part on bid amounts associated with the advertisements. For example, an auction process is applied to the advertisements to rank 512 the advertisements based on an expected value determined from their associated bid amounts and a likelihood of the user accessing each of the advertisements. Alternatively, news feed stories and advertisements included in the additional content items and in the previously provided but not viewed content items are included in a unified ranking. For example, an organic value is associated with each news feed story and an expected value is determined for each of the advertisements based at least in part on the bid amount associated with the advertisements. The expected value of each of the advertisements is converted into an organic value and the news feed stories and advertisements are ranked 512 together based on the organic value; alternatively, the organic value of each news feed story is converted into an expected value, and the news feed stories and advertisements are ranked 512 together based on the expected values. Ranking both news feed stories and advertisements is further described in U.S. patent application Ser. No. 13/545,266, filed on Jul. 10, 2012, which is hereby incorporated by reference in its entirety.

Based on the ranking 512, one or more content items are selected and provided 514 to a user device for presentation to the user. For example, the content items are ranked 512 by the news feed ranking module 114 and may be highlighted by the news feed story highlighting module 308 in the news feed manager 110. In one embodiment, the content items are selected from the ranked content items based according to a prediction model generated by the news feed story highlighting module 308 based on previous user interactions on the social networking system 100. In another embodiment, the ranking of the content items changes based on interactions performed by the user between when content items in the ranking were initially provided to the user and when the request for content items was received 504, as well as newly generated or received content items. For example, actions performed by the user between content items being initially provided to the user device and the ranking 512 of the previously presented but not viewed content items modify the ranking of the previously presented but not viewed content items relative to each other. In one embodiment, content items having at least a threshold position in the ranking are provided in the order determined by the ranking, while remaining content items are presented in a chronological order, such as reverse chronological order.

After the new news feed stories are provided 514 to the user device, the view state for the user is updated to include a new order of the content items provided to the user. The updated view state is stored in the view state object 120 associated with the user profile object 102 for the viewing user. The view state is used by the social networking system 100 to determine 408 whether the user has viewed the provided content items, as further described above.

Figure 6A:
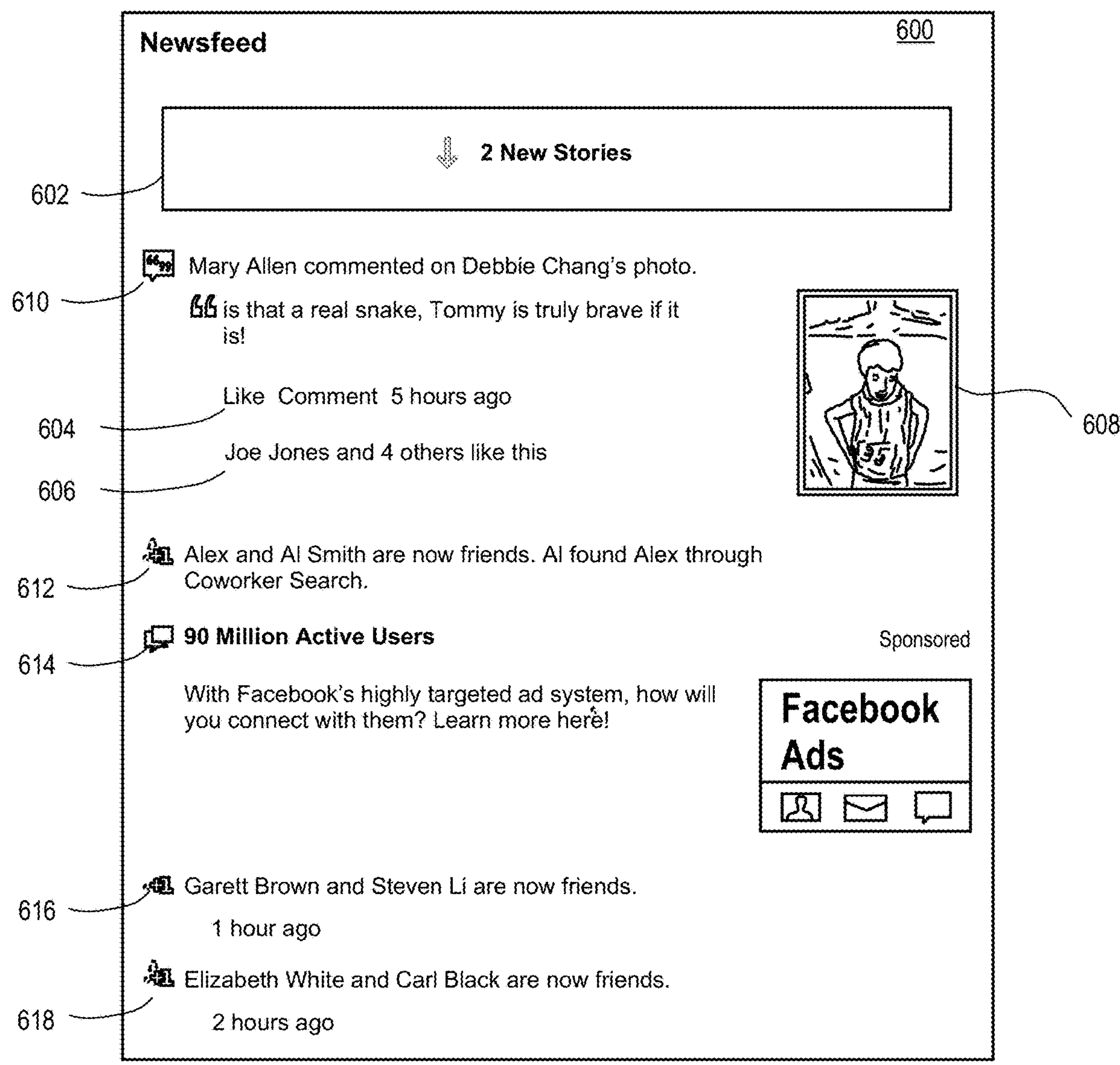

FIGS. 6A and 6B are examples of a user interface of a process of providing content to a viewing user of a social networking system, in accordance with an embodiment. In FIG. 6A, the user interface provides a newsfeed 600 to a viewing user of the social networking system. The newsfeed 600 includes a plurality of newsfeed stories, including a newsfeed story 610 about Mary Allen commenting on Debbie Chang's photo 608, a newsfeed story 612 indicating a new connection was formed between users Alex and Al Smith, an advertisement 614, a newsfeed story 616 indicating a new connection was formed between users Garrett Brown and Steven Li, and a newsfeed story 618 indicating a new connection was formed between users Elizabeth White and Carl Black. The newsfeed story 610 includes links 604 for the viewing user to interact with the newsfeed story 610, including expressing approval of the newsfeed story 610 by "liking" it and commenting on the newsfeed story 610. The newsfeed story 610 also includes a social indicator 606 of other users that expressed interest in the newsfeed story 610.

The newsfeed 600 illustrated in FIG. 6A also includes an incoming newsfeed stories link 602 that indicates to the viewing user that there are additional newsfeed stories that are ready to be presented. As shown in FIG. 6A, there are "2 New Stories" available to be presented to the viewing user as described in the incoming newsfeed stories link 602. Over time, as more new incoming newsfeed stories are generated by the newsfeed generator 300, the number of new stories available in the incoming newsfeed stories link 602 will increase. In one embodiment, the new incoming newsfeed stories will not be presented to the viewing user until the viewing user clicks on the incoming newsfeed stories link 602. In another embodiment, the new incoming newsfeed stories are presented to the viewing user after a predetermined time period elapses. In yet another embodiment, the new incoming newsfeed stories are presented to the viewing user if there is a highly relevant newsfeed story, as determined by the newsfeed story highlighting module 308 in the newsfeed manager 110. In a further embodiment, new incoming newsfeed stories are presented to the viewing user without the incoming newsfeed stories link 602 being rendered. In that embodiment, new incoming newsfeed stories are presented to the viewing user upon generation.

In FIG. 6B, the user interface includes a newsfeed 600 that includes the new incoming newsfeed stories. In one embodiment, the viewing user has click on the incoming newsfeed stories link 602 illustrated in FIG. 6A, resulting in the presentation for display in the newsfeed 600 of a newsfeed story 620 about a link to a video on an external website shared by user Michael Roberts and 34 other users connected to the viewing user and a newsfeed story 628 indicating a new connection was formed between users Mary Joseph and Peter Carol. The newsfeed story 620 includes a time indicator 622 of when the link was first shared with the viewing user, 10 hours ago. The newsfeed story 620 also includes a recent comment on the link by another user of the social networking system that further includes a time indicator of when the comment was made, 45 minutes ago. Finally, the newsfeed story 620 includes a grouping link 626 that indicates information about other users connected to the viewing user that have also shared the link. Upon clicking the grouping link 626, the comments of the other users are presented in the newsfeed 600 within the newsfeed story 620.

The newsfeed story 628 also includes a time indicator 630 of when the new connection was formed, 1 hour ago. As illustrated in FIG. 6B, the newsfeed story 620 that comprises a combined post of multiple posts sharing the same link was first shared with the viewing user 10 hours ago, and yet the newsfeed story 620 is presented above the newsfeed story 628 which was completed an hour ago. In one embodiment, the newsfeed story highlighting module 308 may have placed the newsfeed story 620 about the shared link to an external video above the newsfeed story 628 about the formation of a new connection between other users of the social networking system because of the type of content included in the newsfeed story 620. The viewing user may be more interested in viewing shared links to external videos. In another embodiment, the newsfeed story highlighting module 308 may have placed the newsfeed story 620 about the shared link to an external video above the newsfeed story 628 because of the user Franc Williams's comment 624 on the shared link that was completed only 45 minutes ago. Because of the new comment from user Franc Williams, the newsfeed story 620 may have evolved into a new incoming newsfeed story as determined by the newsfeed story highlighting module 308. In yet another embodiment, if the viewing user did not have a preference of the content type of the newsfeed story 620 about the shared link to an external video, then the recent comment 624 from user Franc Williams made the newsfeed story 620 more relevant to the viewing user than the later formation of a connection between other users of the social networking system 100.

The new incoming newsfeed stories 620 and 628 appear above the previously presented newsfeed stories 610 and 612 within the newsfeed 600. In one embodiment, the incoming newsfeed stories 620 and 628 are dynamically rendered in the newsfeed 600 upon the viewing user clicking on the link 602 as illustrated in FIG. 6A. In another embodiment, the incoming newsfeed stories 620 and 628 are automatically rendered in the newsfeed 600 upon generation by the newsfeed generator 300 in the newsfeed manager 110. In yet another embodiment, the incoming newsfeed stories 620 and 628 may be presented to the viewing user in the newsfeed 600 even if the viewing user does not click on the link 602 because the newsfeed manager 110 determines that the incoming newsfeed stories 620 and 628 are of such relevance that the viewing user would want to view the incoming newsfeed stories 620 and 628. In a further embodiment, the incoming newsfeed stories 620 and 628 are dynamically rendered in the newsfeed 600 because the newsfeed manager 110 detects that the viewing user is actively engaged with the user interface that includes the newsfeed 600, such as detecting a scroll action, a click action on links within the newsfeed 600, or an active browser window or mobile application. In an alternative embodiment, the incoming newsfeed stories 620 and 628 are dynamically rendered in the newsfeed 600 upon the lapse of a predetermined time period.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

maintaining, by a social networking system, a view state for a user of the social networking system, the view state being a record of content items that identifies:

a plurality of content items as having been sent to a user device, one or more of the plurality of content items as having been presented to the user, and an order in which the one or more of the plurality of content items were presented to the user;

receiving, by the social networking system, a request for content items associated with the user;

identifying, by the social networking system based on the view state, at least one content item as having not been presented to the user, the at least one content item of the plurality of content items identified by the view state as having been sent to the user device;

identifying, by the social networking system based on the view state, additional content items as having changed state since presentation of the one or more of the plurality of content items to the user, the additional content items being from the one or more of the plurality of content items identified by the view state as having been presented to the user, and wherein identifying the additional content items as having changed state includes:

receiving specified new interaction from at least one other user with respect to the additional content items;

identifying, by the social networking system, a content item, from the at least one content item identified as having not been presented to the user, as having at least a threshold relevance to the user;

ranking, by the social networking system based on relevance to the user, the additional content items and the content item identified as having not been presented to the user and as having at least the threshold relevance to the user;

selecting, by the social networking system, one or more content items based at least in part on the ranking, the selected one or more content items forming a set of content items; and sending, from the social networking system, a newsfeed to the user device for presentation to the user, the newsfeed comprising the selected set of content items displayed above a subset of the one or more of the plurality of content items.

2. The computer-implemented method of claim 1, further comprising:

updating the view state for the user to identify the selected set of content items as having been sent to the user device and an order in which the selected set of content items were presented.

3. The computer-implemented method of claim 1, wherein the newsfeed comprising the selected set of content items displayed above the subset of the one or more of the plurality of content items includes the content item identified as having not been presented to the user and identified as having at least the threshold relevance to the user.

4. The computer-implemented method of claim 1, wherein the plurality of content items includes one or more advertisements.

5. The computer-implemented method of claim 4, wherein identifying, by the social networking system, the content item, from the at least one content item identified as having not been presented to the user, as having at least the threshold relevance to the user comprises:

retrieving one or more advertisements previously sent to the user device greater than a threshold time interval from a time when the request for content items was received, the one or more advertisements having not been presented to the user.

6. The computer-implemented method of claim 5, wherein ranking, by the social networking system based on relevance to the user, the additional content items and the at least one content item identified as having not been presented to the user and as having at least the threshold relevance to the user comprises:

ranking one or more identified advertisements based at least in part on bid amounts associated with each of the retrieved one or more advertisements.

7. The computer-implemented method of claim 1, wherein the content item identified as having not been presented to the user and as having at least the threshold relevance to the user includes one or more newsfeed stories describing actions by other users of the social networking system.

8. The computer-implemented method of claim 7, wherein ranking, by the social networking system based on relevance to the user, the additional content items and the content item identified as having not been presented to the user and as having at least the threshold relevance to the user comprises:

determining affinities between the user and additional users described by each of the one or more newsfeed stories; and ranking the one or more newsfeed stories based at least in part on the affinities.

9. The computer-implemented method of claim 1, wherein the specified new interaction from the at least one other user includes at least one of a new like, a new share, or a new comment.

10. A computer program product comprising a non-transitory computer-readable storage medium containing computer program code for:

maintaining, by a social networking system, a view state for a user of the social networking system, the view state being a record of content items that identifies:

a plurality of content items as having been sent to a user device, one or more of the plurality of content items as having been presented to the user, and an order in which the one or more of the plurality of content items were presented to the user;

receiving, by the social networking system, a request for content items associated with the user;

identifying, by the social networking system based on the view state, at least one content item as having not been presented to the user, the at least one content item of the plurality of content items identified by the view state as having been sent to the user device;

identifying, by the social networking system based on the view state, additional content items as having changed state since presentation of the one or more of the plurality of content items to the user, the additional content items being from the one or more of the plurality of content items identified by the view state as having been presented to the user, and wherein identifying the additional content items as having changed state includes:

receiving specified new interaction from at least one other user with respect to the additional content items;

identifying, by the social networking system, a content item, from the at least one content item identified as having not been presented to the user, as having at least a threshold relevance to the user;

ranking, by the social networking system based on relevance to the user, the additional content items and the content item identified as having not been presented to the user and as having at least the threshold relevance to the user;

selecting, by the social networking system, one or more content items based at least in part on the ranking, the selected one or more content items forming a set of content items; and sending, from the social networking system, a newsfeed to the user device for presentation to the user, the newsfeed comprising the selected set of content items displayed above a subset of the one or more of the plurality of content items.

11. The computer program product of claim 10, further comprising:

updating the view state for the user to identify the selected set of content items as having been sent to the user device and an order in which the selected set of content items were presented.

12. The computer program product of claim 10, wherein the newsfeed comprising the selected set of content items displayed above the subset of the one or more of the plurality of content items includes the content item identified as having not been presented to the user and identified as having at least the threshold relevance to the user.

13. The computer program product of claim 10, wherein the plurality of content items includes one or more advertisements.

14. The computer program product of claim 13, wherein identifying, by the social networking system, the content item, from the at least one content item identified as having not been presented to the user, as having at least the threshold relevance to the user comprises:

retrieving one or more advertisements previously sent to the user device greater than a threshold time interval from a time when the request for content items was received, the one or more advertisements having not been presented to the user.

15. The computer program product of claim 14, wherein ranking, by the social networking system based on relevance to the user, the additional content items and the at least one content item identified as having not been presented to the user and as having at least the threshold relevance to the user comprises:

ranking one or more identified advertisements based at least in part on bid amounts associated with each of the retrieved one or more advertisements.

16. The computer program product of claim 10, wherein the content item identified as having not been presented to the user and as having at least the threshold relevance to the user includes one or more newsfeed stories describing actions by other users of the social networking system.

17. The computer program product of claim 14, wherein ranking, by the social networking system based on relevance to the user, the additional content items and the content item identified as having not been presented to the user and as having at least the threshold relevance to the user comprises:

determining affinities between the user and additional users described by each of the one or more newsfeed stories; and ranking the one or more newsfeed stories based at least in part on the affinities.

18. A social networking system comprising:

a processor;

a computer readable storage medium coupled to the processor, the computer readable storage medium including instructions that, when executed by the processor, cause the processor to perform steps comprising:

maintaining, by the social networking system, a view state for a user of the social networking system, the view state being a record of content items that identifies:

a plurality of content items as having been sent to a user device, one or more of the plurality of content items as having been presented to the user, and an order in which the one or more of the plurality of content items were presented to the user;

receiving, by the social networking system, a request for content items associated with the user;

identifying, by the social networking system based on the view state, at least one content item as having not been presented to the user, the at least one content item of the plurality of content items identified by the view state as having been sent to the user device;

identifying, by the social networking system based on the view state, additional content items as having changed state since presentation of the one or more of the plurality of content items to the user, the additional content items being from the one or more of the plurality of content items identified by the view state as having been presented to the user, and wherein identifying the additional content items as having changed state includes:

receiving specified new interaction from at least one other user with respect to the additional content items;

identifying, by the social networking system, a content item, from the at least one content item identified as having not been presented to the user, as having at least a threshold relevance to the user;

ranking, by the social networking system based on relevance to the user, the additional content items and the content item identified as having not been presented to the user and as having at least the threshold relevance to the user;

selecting, by the social networking system, one or more content items based at least in part on the ranking, the selected one or more content items forming a set of content items; and sending, from the social networking system, a newsfeed to the user device for presentation to the user, the newsfeed comprising the selected set of content items displayed above a subset of the one or more of the plurality of content items.

19. The system of claim 18, wherein the newsfeed comprising the selected set of content items displayed above the subset of the one or more of the plurality of content items includes the content item identified as having not been presented to the user and identified as having at least the threshold relevance to the user.

20. The system of claim 18, wherein the plurality of content items includes one or more advertisements.

* * * * *